United States Patent
Sensarma et al.

(10) Patent No.: US 6,187,882 B1
(45) Date of Patent: Feb. 13, 2001

(54) PROCESS FOR POLYMERIZATION OF OLEFINS

(75) Inventors: Soumen Sensarma, West Bengal; Swaminathan Sivaram, Pune, both of (IN)

(73) Assignee: Council of Scientific & Industrial Research, New Delhi (IN)

(*) Notice: Under 35 U.S.C. 154(b), the term of this patent shall be extended for 0 days.

(21) Appl. No.: 08/856,315

(22) Filed: May 14, 1997

(30) Foreign Application Priority Data

Feb. 21, 1997 (IN) .............................................. 421/DEL/97

(51) Int. Cl.[7] ........................................................ C08F 4/42
(52) U.S. Cl. .......................... 526/120; 526/153; 526/281; 526/282; 526/308; 526/943; 526/348.2; 526/348.4; 526/348.5; 526/348.6; 502/152
(58) Field of Search ..................................... 526/153, 160, 526/348.2, 348.4, 348.5, 348.6, 308, 281, 282, 943; 502/152

(56) References Cited

U.S. PATENT DOCUMENTS

| | | | |
|---|---|---|---|
| 4,950,630 | * | 8/1990 | Murata et al. ........................ 502/116 |
| 5,106,804 | * | 4/1992 | Bailly et al. ......................... 502/108 |
| 5,614,455 | * | 3/1997 | Herrmann et al. .................... 502/115 |
| 5,700,749 | * | 12/1997 | Tsytsui et al. ....................... 502/117 |
| 5,792,819 | * | 8/1998 | Erker et al. ......................... 522/134 |

FOREIGN PATENT DOCUMENTS

435514 * 7/1991 (EP) .

* cited by examiner

Primary Examiner—David W. Wu
Assistant Examiner—Ling-Siu Choi
(74) Attorney, Agent, or Firm—Birch, Stewart, Kolasch & Birch, LLP.

(57) ABSTRACT

The invention relates to a process for the polymerization of olefins, which comprises polymerizing an olefin or mixture thereof in presence of a solvent, a supported metallocene and an aluminoxane as cocatalyst in a hydrocarbon medium, at a temperature in the range of 50 to 150° C., at a pressure ranging between 1 to 20 bar, for a period of 10 minutes to 10 hours, scavenging the reaction mixture by addition of an organoaluminum compound to remove the last traces of impurities of solvent, separating the polymer by conventional methods like precipitating, filtering, washing the polymer with an organic solvent, drying the polymer to remove the solvent to obtain the product.

16 Claims, No Drawings

PROCESS FOR POLYMERIZATION OF OLEFINS

FIELD OF THE INVENTION

This invention relates to a process for polymerization of olefins. More particularly, it relates to an improved process of polymerization and copolymerization using a solid catalyst capable of giving olefin polymers and copolymers with high catalyst activity especially at high temperatures. Still more particularly, it relates to the process using an improved metallocene catalyst supported with the magnesium halide and silica.

DESCRIPTION OF THE RELATED ART

U.S. Pat. No. 5,032,562, describes the preparation of a solid supported catalyst, by the reaction of dibutyl magnesium, a zirconium based neutral metallocene and a compound of a transition metal halide such as titanium tetrachloride and impregnating the said precursor presence onto silica in the of an aluminoxane activator. However, this catalyst results in bimodal distribution of molecular weights, which is not desirable in most of the applications where polyethylene is used.

JP 04,96,908, describes another supported solid catalyst prepared by reacting aqueous magnesium halides in the presence of silica, metallocene and an organoaluminum activator, which shows only moderate activity towards ethylene polymerization at 80° C.

Eur.Pat.No.EP 613,908, describes a silica-magnesium chloride supported metallocene catalyst which in the presence of an organoboron compound polymerizes ethylene with high yield. However, the catalyst prepared according to this method is not very stable to storage and handling.

During the course of their research the inventors of the present invention have found that the presence of small amounts of anhydrous magnesium chloride (<3%) in the silica supported metallocene catalysts effects unexpected benefits in terms of catalyst activity, molecular weight and molecular weight distributions.

Anhydrous magnesium chloride, commonly used as a support in high activity olefin polymerization catalyst is, often not convenient because it is very brittle and undergoes attrition in the polymerization reactor very easily. Silica is a well known support for gas phase as well as fluidized bed polymerization of olefins using titanium based Ziegler-Natta catalysts; however, when used with metallocene-type catalysts silica supports show low polymerization activities. Therefore, a combination of the two, namely, silica and anhydrous magnesium chloride, offers a good balance to prepare catalysts with high activity, controlled particle size and good attrition strength.

SUMMARY OF THE INVENTION

Therefore, the present invention provides a process for polymerization and copolymerization of olefins using the said solid catalyst capable of producing high catalyst activity. In addition, the process could be carried out especially at high temperatures and capable of being used either in gas or slurry phase.

DETAILED DESCRIPTION OF THE INVENTION

The present invention includes a process for the preparation of improved supported metallocene catalyst which is capable of being employed for the polymerization of the olefins especially ethylene. The said catalyst comprises of atoms of Mg, halides more particularly Cl, an electron donor compound such as tetrahydrofuran, a neutral metallocene and a solid support based on a refractory oxide.

In other words, the solid catalyst prepared as per the present process essentially comprises, a) a particulate carrier composed of an oxide of at least one selected from among those belonging to the groups II, III, IV of the Periodic Table having a surface area of about 300 m$^2$/g and containing at least 3 mmol of hydroxyl group per gram of the oxide.

b) a transition metal compound of a metal belonging to the group IVB of the Periodic Table containing a ligand having a cyclopentadienyl skeleton.

c) a particulate compound magnesium halide has the structure MgX$_2$ where, X is selected from the group containing Cl, Br, or I.

wherein the magnesium halide and the transition metal compound are supported on the particulate carrier.

Another object of the present invention is to provide a process for the preparation of a solid catalyst capable of being employed for the polymerization of the olefins especially ethylene, said catalyst comprising atoms of Mg, Cl, an electron donor compound such as tetrahydrofuran, a neutral metallocene and a solid support based on a refractory oxide.

Accordingly, the present invention provides a process for the preparation of a supported metallocene catalyst which comprises, preparing a precursor catalyst material which consists of preparing the solution of magnesium halide compound in an electron donor solvent in which the magnesium halide will be completely soluble, heating the solution to a temperature in the range of 65° C. to the boiling point of the respective electron donor for a period ranging between 10 to 60 minutes, separately preparing the solution of the metallocene compound into the same electron donor solvent, heating the solution to a temperature in the range of 25° C. to 70° C. for a period ranging between 0.1 to 0.5 hrs., mixing the two solutions to obtain the homogenous solution of catalyst precursor compound, stirring and maintaining this resulting homogenous solution at a temperature in the range of 50° C. to 70° C. for a period of 0.5 to 2 hrs., separately preparing the slurry of the support in the liquid hydrocarbon medium, heating the slurry to a temperature in the range of 50° C. to 75° C. and stirring it for a period of 0.25 to 2 hrs., mixing the homogenous solution of the catalyst precursor compound with the slurry of the support, stirring the slurry for 0.5 to 3 hrs maintaining at a temperature ranging between 50° C. to 70° C., cooling the resultant slurry to room temperature under inert atmosphere, separating the solid by conventional methods, washing the solid by hydrocarbon solvent, drying the solid under vacuum to obtain the product.

The electron donor solvent used for the preparation of the solution of the magnesium halide may be alkyl esters of aliphatic and aromatic carboxylic acids, aliphatic ethers, cyclic ethers and aliphatic ketones, alkyl esters of C1 to C4 saturated aliphatic carboxylic acids; alkyl esters of C7 to C8 aromatic carboxylic acids; C2 to C6 or more preferably C3 to C4 aliphatic ethers; C3 to C4 cyclic ethers, C4 mono or di ether are preferred. Most preferred being methyl formate, ethyl acetate, butyl acetate, hexyl ether, tetrahydrofuran, and dioxane.

The magnesium halide used may be such as magnesium chloride, magnesium bromide and magnesium iodide, preferably magnesium chloride.

Further, the metallocene compound used in the above catalyst has a general formula
(Cp)a(Cp)'bMXx
Cp and Cp' designate each an unsaturated hydrocarbonic radical having a cyclopentadienyl skeleton with a central atom M. The groups Cp and Cp' can be obtained by a covalent bridge (bond).
M indicates the transition metal which are chosen from the groups IIIB, IVB, VB and VIB of the Periodic Table.
a, b and x designate the integral numbers such as a+b+x=m, x>0, and a and/or b not equal to zero.
m indicates the valency of the transition metal M
X designates a halogen selected from Cl, Br and I.

The transitional element in the metallocene compound may be such as scandium, titanium, zirconium, hafnium and vanadium, preferably zirconium.

The Cp and Cp' groups in the metallocene compound are a mono- or a polycyclic group having a cyclopentadienyl skeleton substituted with 5 to 50 carbon atoms such as cyclopentadienyl, indenyl, or a fluorenyl radical or a derivative substituted by this radical containing up to 10 carbon atoms, or a radical derived from the elements chosen from the group VA of the Periodic Table, such as N or P.

Refractory oxide support contains hydroxyl functional groups and may have a specific surface area (BET) of 50 to 1000 $m^2/g$, especially, from 100 to 400 $m^2/g$ and a pore vol. of 0.5 to 5 ml/g preferably, from 1 to 3 ml/g.

In yet another embodiment of the present invention, the support may be selected from inert porous materials such as dry powders of oxides of silicon or aluminum having an average particle size of about 10 to 250 microns, preferably 50 to 150 microns and a surface area of 50 to 600 $m^2/g$, preferably 100 to 300 $m^2/g$.

In one embodiment of the present invention, the ratio of magnesium halide per mole of the metallocene compound is 0.5 to 50, preferably 1 to 8.

In a particular embodiment, the $(CP)_a (CP)_b M X_x$ may be selected from $Cp_2ZrCl_2$ and bis-indenyl zirconium dichloride. The amount of magnesium halide to the carrier may be in the range of 0.5 to 50 wt %.

In a feature of the present invention, the inert support materials should be dry, i.e., free of absorbed water. Drying of the carrier materials can be effected by heating at a temperature of about 150° C. or more and/or by treating these materials by means of aluminum alkyls compounds or aluminoxanes compounds. The higher the calcining temperature, the lower is the amount of hydroxyl group on the support. Temperatures of about 150 to 900° C. can be used, with the preferred range between 400 to 600° C. Modification of the support in this manner provides the catalyst composition with increased activity.

The quantity of hydroxyl groups in the support depends on the support employed (its specific area), the physicochemical treatment and on drying to which it may have been subjected beforehand. A support which is ready for use generally contains from 0.1 to 5 preferably, from 0.5 to 3 mmol of hydroxyl groups per gram.

In a feature of the present invention, the support which may be granular, is preferably devoid of free water at the time of its use in the catalyst preparation. For this purpose, it can be preferably made free of water by means of which are well known, such as heat treatment ranging from 100 to 950° C. especially, 150 to 700° or by treating the oxide material with aluminum alkyl or aluminoxane compounds. The support may be chosen, in particular, from a silica, alumina, silica-alumina or a mixture of these oxides, and may consist of particles which have a mass mean diameter ranging from 30 to 240 microns especially, from 50 to 150 microns. The use of silica is preferred, especially ones sold by Davison Chemical under the commercial reference Davison 952.

In another feature of the present invention, the essential characteristics of a solid catalyst precursor is the halide state of the neutral metallocene containing at least one cyclopentadienyl ligand in the backbone.

Neutral metallocene with formula $((CP)_a (CP')_b MX_x)$ may be cited as an example, in which X is selected from Cl, Br and I. The mono and dihalide scandium metallocenes such as chlorodi(cyclopentadienyl)scandium, and dichloro (indenyl) scandium, mono, di and trihalo titanium metallocenes, such as chloro-tri(pentamethyl cyclopentadienyl)titanium, trichloro (cyclopentadienyl) titanium, mono, di or trihalides of zirconium such as trichloro(cyclopentadienyl)zirconium, dichloro(bis-cyclopentadienyl)zirconium metallocene. Among which, the last one is the most preferred.

Yet another feature of the present invention is that the electron donor compound should be a liquid organic compound at 25° C. and in which the metallocene and the magnesium compound are partially or completely soluble.

In yet another feature of the present invention, the precursor is formed by dissolving at least one metallocene compound and at least one magnesium compound in at least one electron donor compound at a temperature of from about 20° C. up to the boiling point of the electron donor compound. The metallocene compound can be added to the electron donor compound before or after addition of the magnesium compound. The dissolution of the magnesium and the metallocene compound can be facilitated by stirring, or by refluxing the two compounds in the electron donor compound. The solution of these two components is impregnated into the porous inert carrier material in a weight ratio of about 0.033:1 to 1:1 and preferably from 0.15:1 to 0.33:1 parts of Mg/Zr/electron donor composites per part by weight of carrier material.

In yet another feature of the present invention the impregnation of the dried support may be accompanied by addition of an aliphatic hydrocarbon solvent to the inert carrier material at a temperature of about 25° C. to near boiling point of the solvent and then admixing the previous magnesium and metallocene compound dissolved in electron donor to the porous carrier material to impregnate the support. The catalyst may be washed several times with an aliphatic hydrocarbon. The excess aliphatic hydrocarbon is then removed by drying under vacuum until a constant weight is obtained. Drying can be done at a temperature from about 40° C. to 80° C., especially, at 25° C. to 35° C.

Additionally, the present invention provides a process for the polymerization of olefins which comprises polymerizing an olefin or mixture thereof in presence of a solvent, a supported metallocene and an aluminoxane as cocatalyst in a hydrocarbon medium, at a temperature in the range of 50 to 150° C., at a pressure ranging between 1 to 20 bar, for a period of 10 minutes to 10 hours, scavenging the reaction mixture by addition of an organoaluminum compound to remove traces of impurities within the solvent, separating the polymer by conventional methods like precipitating, filtering, washing the polymer with an organic solvent, drying the polymer to remove the solvent to obtain the product.

In an embodiment of the present invention the olefin used may be selected from ethylene, propylene, and other α-olefins, preferably ethylene.

In another embodiment the supported metallocene catalyst used for the polymerization of the olefins may be prepared as per the process described herein.

In yet another embodiment, the aluminoxane cocatalyst used may be selected from methylaluminoxane, hexaisobutylaluminoxane, preferably methylaluminoxane.

In a further embodiment, the hydrocarbon medium used in the polymerization may be selected from n- pentane, n-hexane, n-heptane, preferably n-hexane and the solvent used may be selected from toluene, xylene, n-hexane, preferably xylene and the like In still another embodiment of the present invention, the metallocene catalyst may be partially or completely soluble in the solvent.

In one another embodiment of the present invention, the mole ratio of Al/Zr may range between 500 to 10,000 preferably 1000 to 5000.

The scaranging organoaluminium compound used is may be selected from trimethylalumiium, triisobutylaluminum, triethylalumimum preferably trimethylaluminium.

In another embodiment of the present invention, the mixture of olefin monomers comprises of ethylene and a second monomer chosen from amongst propylene, 1-butene, 1-hexene, 1-octene, 4-methyl-1-pentene, and cyclic olefins such as norbornene, cyclohexene, 2-vinyl-5-norbornene.

In another preferred feature of the present invention, the solid catalyst prepared has Zr, Cl, Mg and THF in the wt % 0.36, 10, 2.5 and 15.7, respectively. solid catalyst thus prepared has the general empirical formula.

The process of the present invention is described hereinbelow with examples which are illustrative only and should not be construed to limit the scope of the present invention in any manner.

Catalyst Preparative

Example 1

This example illustrates the preparation of the catalyst precursor.

All glass equipment were heated under vacuum and flushed with nitrogen. All manipulations involving air-sensitive compounds were performed inside a Labconco Model 50004 inert atmosphere glove box continuously purged with high purity $N_2$ from a generator (Spantech Model NG 300-1) or under a positive pressure of high purity $N_2$ using standard bench top inert atmosphere techniques. The solvent n-hexane and electron donor used in each case were freshly distilled over sodium under $N_2$. Magnesium was estimated titrimetrically using EDTA. Chlorine was estimated by argentometric methods. The amount of zirconium in the catalyst was determined by using an Inductively Coupled Plasma ionization spectrometer.

Catalyst Preparative

Example 2

A support, namely, "Davison 952" silica powder sold by Davison Chemical Company which had a specific surface area of 300 $m^2/g$ and a pore volume 1.65 cc/g, 2.8 mmol hydroxyl groups per g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 394.3 mg was added followed by addition of 70 ml of tetrahydro-furan. The resulting mixture was then heated to 60–65° C. for ½ h until all magnesium chloride dissolved in tetrahydrofuran. Bis(cyclopentadienyl) zirconium (IV) dichloride, (335 mg) was dissolved in 20 ml of tetrahydrofuran and the solution was added to the solution of magnesium chloride over a period of 15 minutes. The resulting homogenous solution was stirred for ½ h at 60–65° C.

In another three neck flask which was flame dried and cooled under $N_2$, 4.22 g of calcined silica was added followed by 300 ml of n-hexane. The slurry was stirred for ½ h at 60–65° C.

The homogenous solution of magnesium chloride and zirconium metallocene in tetrahydrofuran prepared as above was added to the slurry of silica solution over a period of ½ h. The whole slurry was stirred for 1 h at 60–65° C.

The slurry was cooled to room temperature under $N_2$, filtered and washed three times each with 50 ml of n-hexane. The solid was dried under vacuum. The amount of Zr, Cl, Mg and THF (wt %) in the resultant catalyst solid was 0.36, 10, 2.4 and 15.7, respectively.

Catalyst Preparative

Example 3

A support, namely, "Davison 952" silica powder sold by Davison Chemical Company which had a specific surface area of 300 $m^2/g$ and a pore volume of 1.65 cc/g, 2.8 mmol of hydroxyl groups per g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 209.5 mg was added followed by addition of 40 ml of tetrahydrofuran. The resulting mixture was then heated at 60–65° C. for ½ h until all magnesium chloride dissolved in tetrahydrofuran. Bis(cyclopentadienyl) zirconium (IV) dichloride, (251 mg) was dissolved in 10 ml of tetrahydrofuran and the solution was added to the solution of magnesium chloride over a period of 25 minutes. The resulting homogenous solution was stirred for ½ h at 60–65° C.

In another three neck flask which was flame dried and cooled under $N_2$, 2.54 g of calcined silica was placed followed by 200 ml of n-hexane. The slurry was stirred for ½ h at 60–65° C.

The homogenous solution of magnesium chloride and zirconium metallocene in tetrahydrofuran prepared as above was added to the slurry of silica solution over a period of ½ h. The whole slurry was stirred for 1 h at 60–65° C.

The slurry was cooled to room temperature under $N_2$, filtered and washed three times each with 30 ml of n-hexane. The solid was dried under vacuum. The amount of Zr, Cl, Mg and THF (wt %) in the resultant catalyst solid was 0.45, 10.7, 2.0 and 17, respectively.

Catalyst Preparative

Example 4

A support, namely, "Davison 952" silica powder sold by Davison Chemical Company which had a specific surface area of 300 $m^2/g$ and a pore volume of 1.65 cc/g, 2.8 mmol of hydroxyl groups per g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 180.3 mg was added followed by addition of 40 ml of tetrahydrofuran. The resulting mixture was then heated at 70–75° C. for ½ h until all magnesium chloride dissolved in tetrahydrofuran. Bis(cyclopentadienyl) zirconium (IV) dichloride, (255 mg) was dissolved in 10 ml of tetrahydrofuran and the solution was added to the solution of magnesium chloride over a period of 20 minutes. The resulting homogenous solution was stirred for ½ h at 70–75° C.

In another three neck flask which was flame dried and cooled under $N_2$, 2.50 g of calcined silica was added followed by 200 ml of n-hexane. The slurry was stirred for ½ h at 70–75° C.

The homogenous solution of magnesium chloride and zirconium metallocene in tetrahydrofuran prepared as above was added to the slurry of silica solution over a period of ½ h. The whole slurry was stirred for 1 h at 70–75° C.

The slurry was cooled to room temperature under $N_2$, filtered and washed three times each with 30 ml of n-hexane. The solid was dried under vacuum. The amount of Zr, Cl, Mg and THF (wt %) in the resultant catalyst solid was 0.48, 9.70, 1.8 and 15.0, respectively.

Catalyst Preparative—Example 5

A support, namely, "Davison 9521" silica powder sold by Davison Chemical Company which had a specific surface area of 300 m$^2$/g and a pore volume of 1.65 cc/g, 2.8 mmol of hydroxyl groups per g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 200 mg was added followed by addition of 50 ml of tetrahydrofuran. The resulting mixture was then heated 60–65° C. for ½ h until all magnesium chloride dissolved in tetrahydrofuran. Bis(cyclopentadienyl) zirconium (IV) dichloride, (250 mg) was dissolved in 15 ml of tetrahydrofuran and the solution was added to the solution of magnesium chloride over a period of 15 minutes. The resulting homogenous solution was stirred for ½ h at 60–65° C.

In another three neck flask which was flame dried and cooled under $N_2$, 2.60 g of calcined silica was added followed by 300 ml of n-hexane. The slurry was stirred for ½ h at 60–65° C.

The homogenous solution of magnesium chloride and zirconium metallocene in tetrahydrofuran prepared as above was added to the slurry of silica solution over a period of ½ h. The whole slurry was stirred for 2 h at 60–65° C.

The slurry was cooled to room temperature under $N_2$, filtered and washed three times each with 50 ml of n-hexane. The solid was dried under vacuum. The amount of Zr, Cl, Mg and THF (wt %) in the resultant catalyst solid was 0.40, 10, 2.2 and 17, respectively.

Catalyst Preparative

Example 6

A support, namely, "Davison 952" silica powder sold by Davison Chemical Company which had a specific surface area of 300 m$_2$/g and a pore volume of 1.65 cc/g, 2.8 mmol of hydroxyl groups per g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 277.6 mg was placed followed by addition of 40 ml of tetrahydrofuran. The resulting mixture was then heated at 60–65° C. for ½ h until all magnesium chloride dissolved in tetrahydrofuran. Bis(cyclopentadienyl) titanium (IV) dichloride, (503 mg) was dissolved in 20 ml of tetrahydrofuran and the solution was added to the solution of magnesium chloride over a period of 15 minutes. The resulting homogenous solution was stirred for ½ h at 60–65° C.

In another three neck flask which was flame dried and cooled under $N_2$, 2.90 g of calcined silica was added followed by 300 ml of n-hexane. The slurry was stirred for ½ h at 60–65° C.

The homogenous solution of magnesium chloride and zirconium metallocene in tetrahydrofuran prepared as above was added to the slurry of silica solution over a period of ½ h. The whole slurry was stirred for 1 h at 60–65° C.

The slurry was cooled to room temperature under $N_2$, filtered and washed three times each with 50 ml of n-hexane. The solid was dried under vacuum. The amount of Ti, Cl, Mg and THF (wt %) in the resultant catalyst sold was 2.64, 11.2, 2.3 and 14.2, respectively.

Catalyst Preparative

Example 7

A support, namely "Davison 952" silica powder sold by Davison Chemical Company which had a specific surface area of 300 m$^2$/g and a pore volume of 1.65 cc/g, 2.8 mmol of hydroxyl groups per g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame under vacuum and cooled under nitrogen. Anhydrous $MgCl_2$, 210 mg was added followed by addition of 70 ml of tetrahydrofuran. The resulting mixture was then heated at 60–65° C. for ½ h until all magnesium chloride dissolved in tetrahydrofuran. Bis(indenyl) zirconium (IV) dichloride, (300 mg) was dissolved in 20 ml of tetrahydrofuran and the solution was added to the solution of magnesium chloride over a period of 15 minutes. The resulting homogenous solution was stirred for ½ h at 60–65° C.

In another three neck flask which was flame dried and cooled under $N_2$, 2.4 g of calcined silica was added followed by 300 ml of n-hexane. The slurry was stirred for ½ h at 60–65° C.

The homogenous solution of magnesium chloride and zirconium metallocene in tetrahydrofuran prepared as above was added to the slurry of silica solution over a period of ½ h. The whole slurry was stirred for 2 h at 60–65° C.

The slurry was cooled to room temperature under $N_2$, filtered and washed three times each with 30 ml of n-hexane. The solid was dried under vacuum. The amount of Zr, Cl, Mg and THF (wt %) in the resultant catalyst solid was 0.30, 9.50, 2.4 and 16, respectively.

All glass equipments were heated under vacuum and flushed with nitrogen. All manipulations involving air-sensitive compounds were performed inside a Labconco Model 50004 inert atmosphere glove box continuously purged with high purity $N_2$ from a generator (Spantech Model NG 300-1) or under a positive pressure of high purity $N_2$ using standard bench top inert atmosphere techniques. The solvent xylene used for the polymerization was freshly distilled over sodium under $N_2$. 1-hexene (hydrocarbon medium) was purified by distilling over $CaH_2$. The intrinsic viscosities of the polymers obtained from the present invention were determined in decalin as solvent at 135° C. using an Ubbelohde viscometer. In all these experiments, methylaluminoxane was added as a 5.4 wt % (as Al) solution in toluene. The MAO (methyl aluminoxane) had a Me/Al ratio 1.7, free trimethylaluminum 31 wt % and Al content 10.9 wt % in toluene.

Crystallinity of the copolymer was measured by Differential Scanning Calorimetry (DSC). Polydispersities and molecular weight distribution of the polyethylene samples were measured by GPC (Waters 150C ALC/GPC) at 135° C. in 1,2,4-trichlorobenzene. $\mu$-Styragel columns $10^5$, $10^4$, $10^3$, 500 A° were used and the peaks were calibrated using a standard polystyrene. A 0.3–0.4 % w/v solution was used at a flow rate of 1.0 mL/min.

Polymerization Example 1

Polymerization of ethylene was performed in a stirred glass reactor at one atmosphere pressure using xylene as diluent. A gas burette with a reservoir containing silicone oil was used to feed ethylene continuously to the cell. The reaction cell was dried at 155° C. overnight and cooled under ethylene. 15.8 mg catalyst ($6.23 \times 10^{-7}$ mol as Zr) was transferred into the cell inside the glove-box. 50 mL xylene was introduced into the cell using a hypodermic syringe. Polymerization was initiated by the addition of methylaluminoxane in toluene ($3.2 \times 10^{-3}$ mol as Al), keeping Al/Zr mol ratio 5000. The reaction temperature was maintained at 70° C. The reaction was terminated after ½ h by addition of acidified methanol. The polymer was filtered, washed with methanol and dried at 40° C. under vacuum.
Yield: 1.5 g
Activity: 53 Kg PE/g-Zr.h
Intrinsic viscosity: 1.7 dL/g
MWD=2.67

Polymerization Example 2

Polymerization of ethylene was performed in a stirred glass reactor at one atmosphere pressure using xylene as diluent. A gas burette with a reservoir containing silicone oil was used to feed ethylene continuously to the cell. The reaction cell was dried at 155° C. overnight and cooled under ethylene. 15 mg catalyst ($5.9 \times 10^{-7}$ mol as Zr) was transferred into the cell inside the glove-box. Xylene (50 mL, previously treated with trimethylaluminum in order to remove the impurities) was introduced into the cell using a hypodermic syringe. Polymerization was initiated by the addition of methylaluminoxane in toluene ($5.9 \times 10^{-4}$ mol as Al), keeping Al/Zr mol ratio 1000. The reaction temperature was maintained at 70° C. The reaction was terminated after ½ h by addition of acidified methanol. The polymer was filtered, washed with methanol and dried at 40° C. under vacuum.
Yield: 1.45 g
Activity: 54 Kg PE/g-Zr.h
Intrinsic viscosity: 2.2 dL/g Polymerization Example 3

Polymerization of ethylene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 15.3 mg catalyst ($6.04 \times 10^{-7}$ mol as Zr) was transferred into the cell inside the glove-box. Xylene (50 mL, previously treated with trimethylaluminum in order to remove the impurities) was introduced into the cell using a hypodermic syringe. Polymerization was initiated by the addition of methylaluminoxane in toluene ($1.208 \times 10^{-3}$ mol as Al), keeping Al/Zr mol ratio 2000. The reaction temperature was maintained at 70° C. The reaction was terminated after ½ h by addition of acidified methanol. The polymer was filtered, washed with methanol and dried at 40° C. under vacuum.
Yield: 1.6 g
Activity: 58 Kg PE/g-Zr.h
Intrinsic viscosity: 1.9 dL/g
MWD=2.3

Polymerization Example 4

Polymerization of ethylene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 16 mg catalyst ($6.5 \times 10^{-7}$ mol as Zr) was transferred into the cell inside the glove-box. Xylene (50 mL, previously treated with trimethylaluminum in order to remove the impurities) was introduced into the cell using a hypodermic syringe. Polymerization was initiated by the addition of methylaluminoxane in toluene ($3.25 \times 10^{-3}$ mol as Al), keeping Al/Zr mol ratio 5000. The reaction temperature was maintained at 70° C. The reaction was terminated after ½ h by addition of acidified methanol. The polymer was filtered, washed with methanol and dried at 40° C. under vacuum.
Yield: 2.1 g
Activity: 69 Kg PE/g-Zr.h
Intrinsic viscosity: 1.8 dL/g
MWD=2.74

Polymerization Example 5

Polymerization of ethylene was performed in a stirred glass reactor at one atmosphere pressure using xylene as diluent A gas-burette with a reservoir containing silicone oil was used to feed ethylene continuously to the cell. The reaction cell was dried at 155° C. overnight and cooled under ethylene. 15.1 mg catalyst ($5.9 \times 10^{-7}$ mol as Zr) was transferred into the cell inside the glove-box. Xylene (50 mL, previously treated with trimethylaluminum in order to remove the impurities) was introduced into the cell using a hypodermic syringe. Polymerization was initiated by the addition of methylaluminoxane in toluene ($2.95 \times 10^{-3}$ mol as Al), keeping Al/Zr mol ratio 5000. The reaction temperature was maintained at 60° C. The reaction was terminated after ½ h by addition of acidified methanol. The polymer was filtered, washed with methanol and dried at 40° C. under vacuum.
Yield: 1.5 g
Activity: 55 Kg PE/g-Zr.h
Intrinsic viscosity: 2.6 dL/g Polymerization Example 6

Polymerization of ethylene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 15.3 mg catalyst ($6.04 \times 10^{-7}$ mol as Zr) was transferred into the cell inside the glove-box. Xylene (50 mL, previously treated with trimethylaluminum in order to remove the impurities) was introduced into the cell using a hypodermic syringe.

Polymerization was initiated by the addition of methylaluminoxane in toluene ($3.02 \times 10^{-3}$ mol as Al), keeping Al/Zr mol ratio 5000. The reaction temperature was maintained at 80° C. The reaction was terminated after ½ h by addition of acidified methanol. The polymer was filtered, washed with methanol and dried at 40° C. under vacuum.

Yield: 1.8 g
Activity: 63 Kg PE/g-Zr.h
Intrinsic viscosity: 0.9 dL/g

Polymerization Example 7

50 mL of xylene were (previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 60+2° C. A stainless steel reservoir was used to feed ethylene continuously. 15.8 mg of previously prepared catalyst ($6.2 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of methylaluminoxane in toluene ($3.1 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.

Yield: 5 g
Activity: 177 kg PE/g-Zr. h.

Polymerization Example 8

50 mL of xylene were (previously treated with timethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 70+3° C. A stainless steel reservoir was used to feed ethylene continuously. 21.3 mg of previously prepared catalyst ($8.4 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of methylaluminoxane in toluene ($4.2 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.

Yield: 7 g
Activity: 183 kg PE/g-Zr. h
Intrinsic viscosity: 2.6 dL/g

Polymerization Example 9

50 mL of xylene were (previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 80+2° C. A stainless steel reservoir was used to feed ethylene continuously. 15.7 mg of previously prepared catalyst ($6.2 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of methylaluminoxane in toluene ($3.1 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.

Yield: 9.5 g
Activity: 336 kg PE/g-Zr. h
Intrinsic viscosity; 2.44 dL/g
MWD=3.07

Polymerization Example 9

50 mL of xylene were previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 100+2° C. A stainless steel reservoir was used to feed ethylene continuously. 21.3 mg of previously prepared catalyst ($8.4 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of methylaluminoxane in toluene ($4.2 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.

Yield: 25 g
Activity: 670 kg PE/g-Zr. h
Intrinsic viscosity: 1.8 dL/g
MWD=2.44

Polymerization Example 11

50 mL of xylene were (previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 105+2° C. A stainless steel reservoir was used to feed ethylene continuously. 21.3 mg of previously prepared catalyst ($8.4 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of methylaluminoxane in toluene ($4.2 \times 10^{-3}$ mol as Al), keeping Al/Zr mol ratio 5000 and a ethylene pressure of 5 bar. The reaction was terminated after ⅓ h by adding acidified methanol. The polymer was filtered, washed with methanol and dried at 40–50° C. under vacuum.

Yield: 21 g
Activity: 822 kg PE/g-Zr. h
Intrinsic viscosity: 1.75 dL/g
MWD=3.05

Polymerization Example 12

50 mL of xylene were (previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 110+2° C. A stainless steel reservoir was used to feed ethylene continuously. 18.8 mg of previously prepared catalyst ($7.4 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of methylaluminoxane in toluene ($3.7 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.
Yield: 30 g
Activity : 890 kg PE/g-Zr. h
Intrinsic viscosity: 1.7 dL/g
MWD=2.78

Polymerization Example 13

50 mL of xylene were (previously treated with timethylalumium in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 80° C. A stainless steel reservoir was used to feed monomer ethylene and hydrogen continuously. 17.2 mg of previously prepared catalyst ($6.8 \times 10^{-7}$ mol as Zr) along with 20 mL xylene was transferred into the reactor by means of a separating funnel. Another 30 mL of xylene was added to the reactor through the separating funnel. 100 mL of hydrogen was introduced into the reservoir. The solvent was saturated with ethylene and hydrogen mixture. Polymerization was initiated by the addition of methylaluminoxane in toluene ($3.4 \times 10^{-3}$ mol as Al), keeping Al/Zr mol ratio 5000 and maintaining pressure of 5 bar. The reaction was terminated after ½ h by adding acidified methanol. The polymer was filtered, washed with methanol and dried at 40–50° C. under vacuum.
Yield: 3.5 g
Activity: 113 kg PE/g-Zr. h
Intrinsic viscosity: 1.48 dL/g

Polymerization Example 14

50 mL of xylene were (previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 90° C. A stainless steel reservoir was used to feed monomer ethylene and hydrogen continuously. 18 mg of previously prepared catalyst ($7.1 \times 10^{-7}$ mol as Zr) along with 20 mL xylene was transferred into the reactor by means of a separating funnel. Another 30 mL of xylene was added to the reactor through the separating funnel. 50 mL of hydrogen was introduced into the reservoir. The solvent was saturated with ethylene and hydrogen mixture. Polymerization was initiated by the addition of methylaluminoxane in toluene ($3.55 \times 10^{-3}$ mol as Al), keeping Al/Zr mol ratio 5000 and maintaining pressure of 5 bar. The reaction was terminated after ½ h by adding acidified methanol. The polymer was filtered, washed with methanol and dried at 40–50° C. under vacuum.
Yield: 17 g
Activity: 525 kg PE/g-Zr. h
Intrinsic viscosity: 1.1 dL/g
MWD=2.64

Polymerization Example 15

Copolymerization of ethylene and 1-hexene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 12.4 mg catalyst ($6.52 \times 10^{-7}$ mol as Zr) was transferred into the cell inside the glove-box. Xylene (50 mL, previously treated with triethylaluminum in order to remove the impurities) was introduced into the cell using a hypodermic syringe followed by addition of 1-hexene ($8.056 \times 10^{-3}$ mol). Polymerization was initiated by the addition of methylaluminoxane in toluene ($3.30 \times 10^{-3}$ mol as Al), keeping Al/Zr mol ratio 5000. The reaction temperature was maintained at 70° C. The reaction was terminated after ½ h by addition of acidified methanol. The polymer was filtered, washed with methanol and dried at 40° C. under vacuum.
Yield: 1.8 g
Activity: 60 Kg PE/g-Zr.h
Intrinsic viscosity: 1.47 dL/g
Crystallinity: 45.33%

Polymerization Example 16

Copolymerization of ethylene and 1-hexene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 12.3 mg catalyst ($6.47 \times 10^{-7}$ mol as Zr) was transferred into the cell inside the glove-box. Xylene (50 mL, previously treated with trimethylaluminum in order to remove the impurities) was introduced into the cell using a hypodermic syringe followed by addition of 1-hexene (0.012 mol). Polymerization was initiated by the addition of methylaluminoxane in toluene ($3.25 \times 10^{-3}$ mol as Al), keeping Al/Zr mol ratio 5000. The reaction temperature was maintained at 60° C. The reaction was terminated after ½ h by addition of acidified methanol. The polymer was filtered, washed with methanol and dried at 40° C. under vacuum.
Yield: 1.7 g
Activity: 56 Kg PE/g-Zr.h
Intrinsic viscosity: 0.985 dL/g
Crystallinity: 31.3%

Comparative Polymerization Example 1

A metallocene catalyst supported on silica was prepared and the amount of zirconium on the solid catalyst was found to be 0.53%.

Polymerization of ethylene was performed in a stirred glass cell at one atmosphere pressure using xylene as diluent. A gas-burette with a reservoir containing silicone oil was used to feed ethylene continuously to the cell. The reaction cell was dried at 155° C. overnight and cooled under ethylene. 10.3 mg catalyst ($5.98 \times 10^{-7}$ mol as Zr) was transferred into the cell inside the glove-box. Xylene (50 mL, previously treated with trimethylaluminum in order to remove the impurities) was introduced into the cell using a hypodermic syringe. Polymerization was initiated by the addition of methylaluminoxane in toulene ($3 \times 10^{-3}$ mol as Al), keeping Al/Zr mol ratio 5000. The reaction temperature was maintained at 70° C. The reaction was terminated after ½ h by addition of acidified methanol. The polymer was filtered, washed with methanol and dried at 40° C. under vacuum.

Yield: 1.2 g
Activity: 44 Kg PE/g-Zr.h
Intrinsic viscosity: 1.5 dL/g
MWD=3.57

It is observed from an examination of a comparative example with those of the working examples that the incorporation of low amounts of anhydrous magnesium chloride (<3%) in the silica support enhances the catalytic activity, increases the molecular weight and narrows the molecular weight distribution (Table-1). The beneficial effect of addition of anhydrous magnesium chloride to silica supported metallocene catalyst for olefin polymerization is unexpected and unanticipated.

TABLE 1

Ethylene Polymerization using $SiO_2$ supported and $SiO_2$-$MgCl_2$ supported $Cp_2ZrCl_2$/MAO catalyst[a]

| Example | Activity (Kg PE/g Zr.h) | [η] dL/g | MWD |
|---|---|---|---|
| Comparative example-1 | 44 | 1.45 | 3.57 |
| Example-4 | 69 | 1.81 | 2.74 |

[a]All polymerization were carried out in xylene (50 mL); Al/Zr = 5000; T = 70° C.; time = 30 min; P = 1 atm of ethylene.

What is claimed is:

1. A process for the polymerization of olefins, which comprises polymerizing an olefin or mixture thereof in presence of a solvent, a supported metallocene and an aluminoxane as cocatalyst in a hydrocarbon medium, at a temperature in the range of 50 to 150° C., at a pressure ranging between 1 to 20 bar, for a period of 10 minutes to 10 hours, scavenging the reaction mixture by addition of an organoaluminum compound to remove the last traces of impurities of solvent, separating the polymer by washing the polymer with an organic solvent, drying the polymer to remove the solvent to obtain the product; wherein the supported metallocene has a central metal chosen from groups IIIB, IVB, VB, and VIB of the Periodic Table;

and wherein the supported metallocene catalyst for the polymerization of the olefins is prepared by a process comprising preparing a precursor catalyst material, by preparing a solution (A) of a magnesium halide in an electron donor solvent in which the magnesium halide is completely soluble; heating the solution (A) to a temperature in the range of 20° C. to the boiling point of the electron donor solvent for a period ranging between 10 to 60 minutes; separately preparing a solution (B) of a metallocene compound in the same electron donor solvent, heating the solution (B) to a temperature in the range of 25° C. to 70° C. for a period ranging between 0.1 to 0.5 hrs., mixing the two solutions (A) and (B) to obtain a homogenous solution of catalyst precursor compound; stirring and maintaining a resulting homogenous solution at a temperature in the range of 50° C. to 70° C. for a period of 0.5 to 2 hrs.; separately preparing a slurry of a support in a liquid hydrocarbon medium; heating the slurry to a temperature in the range of 50° C. to 75° C. and stirring for a period of 0.25 to 2 hrs.; mixing the homogenous solution of the catalyst precursor compound with the resulting slurry of the support to produce a product slurry, stirring the product slurry for 0.5 to 3 hrs at a temperature ranging between 50° C. to 70° C.; cooling the product slurry to room temperature under an inert atmosphere; separating the resulting solid supported metallocene catalyst from the solvents of the product slurry, washing the solid supported metallocene catalyst with a hydrocarbon solvent, and drying the catalyst under vacuum.

2. The process as claimed in claim 1, wherein the olefin is selected from the group consisting of ethylene and α-olefins.

3. The process as claimed in claim 1 wherein the catalyst is prepared from a precursor having the formula
$MgX_aM_b(ED)_cCp_d$
wherein,
X is selected from the group consisting of Cl, Br, I and mixtures thereof,
M indicates a transition metal which is chosen from groups IIIB, IVB, VB, and VIB of the Periodic Table,
ED is an electron donor compound.

4. The process as claimed in claim 1 wherein the aluminoxane co-catalyst used is selected from the group consisting of methylaluminoxane, ethylaluminoxane, and hexaisobutylaluminoxane.

5. The process as claimed in claim 1 wherein the hydrocarbon medium is selected from the group consisting of n-pentane, n-hexane, and n-heptane.

6. The process as claimed in claim 1 wherein the solvent used in the reaction is selected from the group consisting of toluene, xylene, n-hexane, and n-heptane.

7. The process as claimed in claim 1 wherein the metallocene catalyst is partially or completely soluble in the solvent.

8. The process as claimed in claim 1 wherein the supported metallocene comprises Zr and the mole ratio of Al/Zr ranges between 500 to 10,000.

9. The process as claimed in claim 1 wherein the organoaluminium compound used is selected from the group consisting of trimethylaluminium, triisobutylaluminium, and triethylaluminium.

10. The process as claimed in claim 1 wherein the mixture of olefin monomers consists of ethylene and a second monomer selected from the group consisting of propylene, 1-butene, 1-hexene, 1-octene, 4-methyl-1-pentene, and cyclic olefins.

11. The process as claimed in claim 3 wherein a is 1.5 to 2.5.

12. The process as claimed in claim 3 wherein b is 0.02 to 0.05.

13. The process as claimed in claim 3 wherein c is 1.5 to 2.5.

14. The process as claimed in claim 3 wherein d is 0.05 to 0.09.

15. The process as claimed in claim 3 wherein the precursor has the formula
$MgCl_{2.75}Zr_{0.039}THF_{2.25}Cp_{0.078}$ and wherein THF= tetrahydrofuran.

16. The process as claimed in claim 10, wherein the cyclic olefin is selected from the group consisting of norbornene, cyclohexene and 2-vinyl-5-norbornene.

* * * * *